(No Model.)
R. F. JONES.
COMBINED CASH AND BUNDLE CONVEYER.
No. 274,000. Patented Mar. 13, 1883.
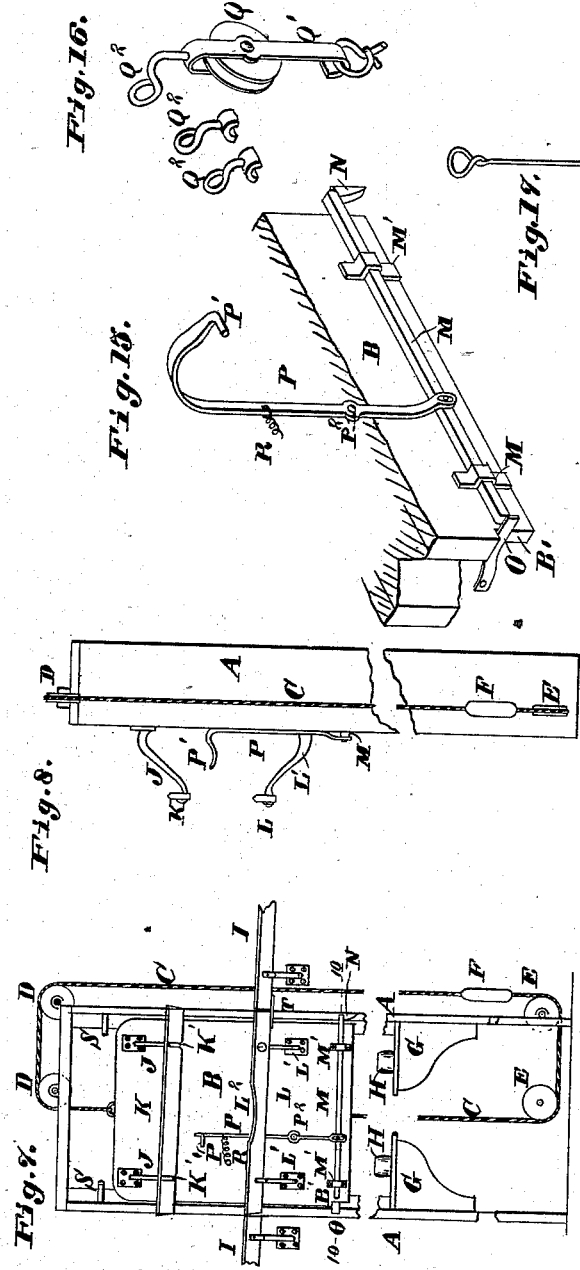
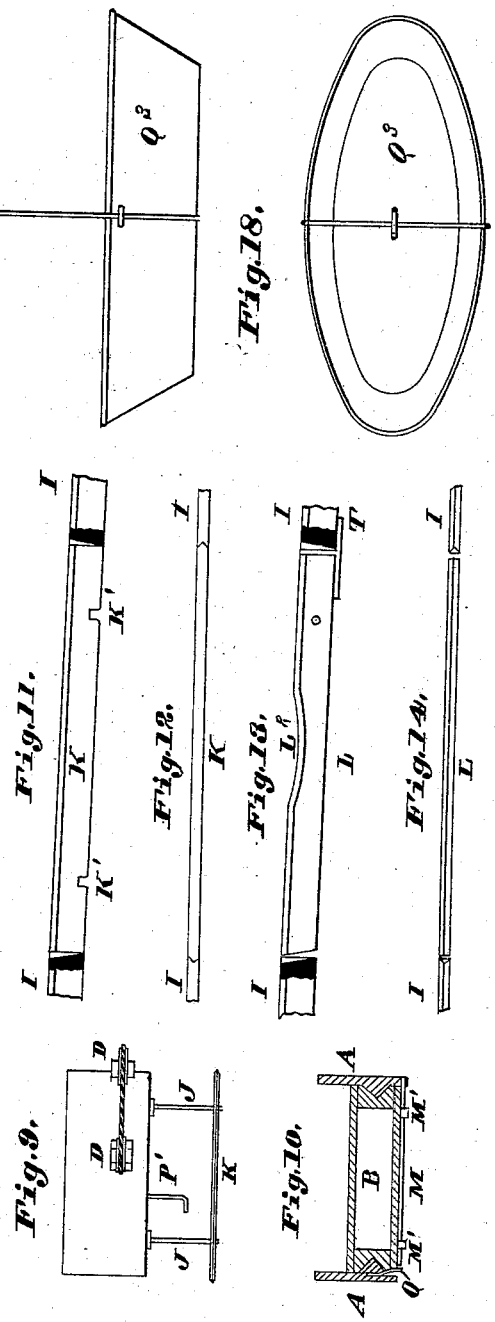
Attest:
Charles Pickles
Wm G. Sayers
Inventor:
Richard F. Jones
By Knight Bros
Attys.

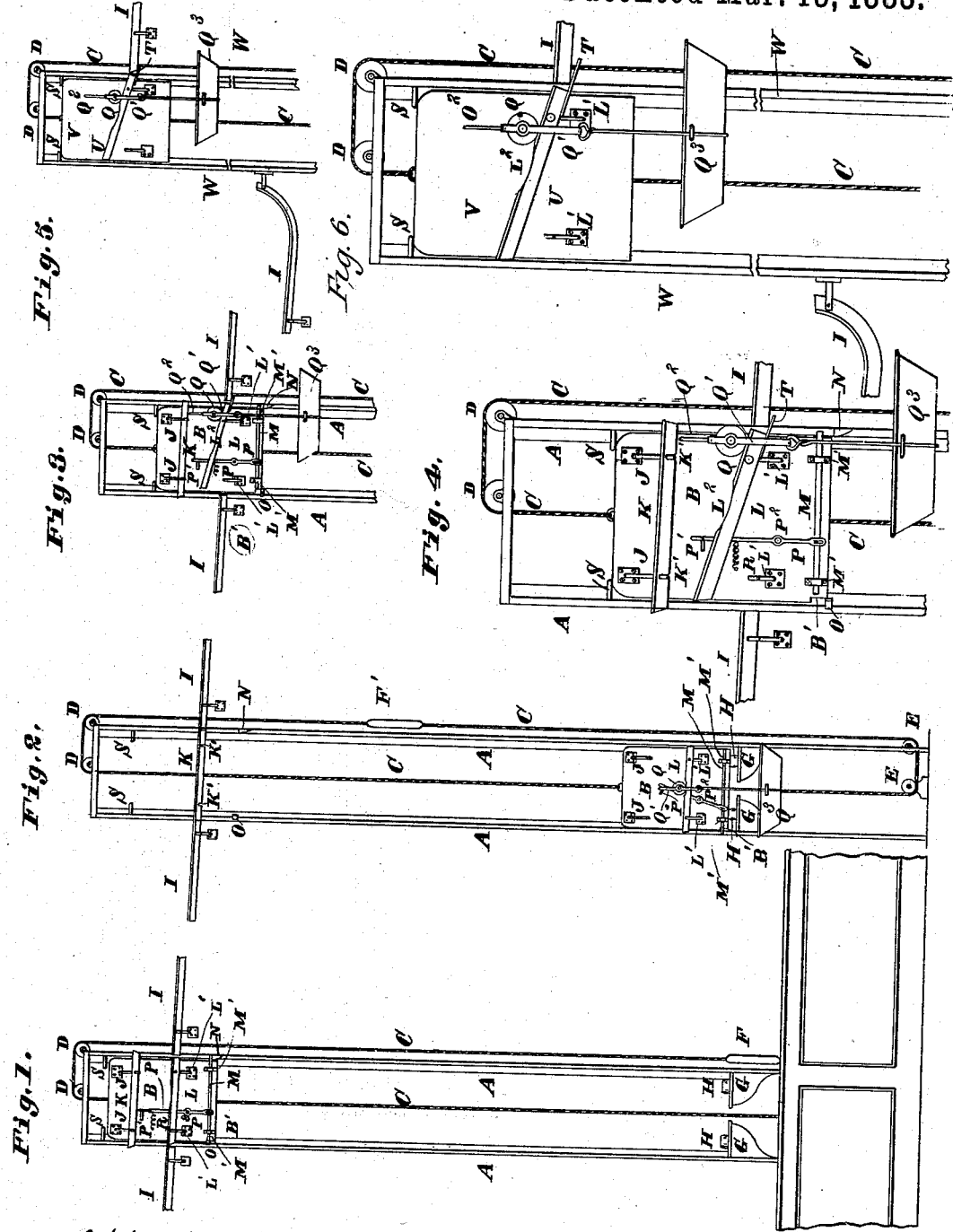

UNITED STATES PATENT OFFICE.

RICHARD F. JONES, OF ST. LOUIS, MISSOURI, ASSIGNOR OF THREE-FOURTHS TO THE FAMOUS SHOE AND CLOTHING COMPANY AND JOSEPH KERR, BOTH OF SAME PLACE.

COMBINED CASH AND BUNDLE CONVEYER.

SPECIFICATION forming part of Letters Patent No. 274,000, dated March 13, 1883.

Application filed September 2, 1882. (No model.)

*To all whom it may concern:*

Be it known that I, RICHARD F. JONES, of the city of St. Louis, in the State of Missouri, have invented a certain new and useful Improvement in a Combined Cash and Bundle Conveyer, of which the following is a full, clear, and exact description, reference being had to the accompanying drawings, forming part of this specification, and in which—

Figure 1 is a front elevation of one of the salesmen's elevators, showing the cage in its upper position. Fig. 2 is a similar view, showing the cage in its lower position. Fig. 3 is a detail of the same, showing the parts in position for operating. Fig. 4 is the same as Fig. 3, enlarged. Fig. 5 is a detail view of the cashier's elevator. Fig. 6 is an enlarged view of Fig. 5. Fig. 7 is an enlarged view of Fig. 1. Fig. 8 is an edge view of one of the salesmen's elevators. Fig. 9 is a top view thereof. Fig. 10 is a transverse section on line 10 10, Fig. 7. Fig. 11 is a detail side view, showing the manner of sustaining the false tracks of the salesmen's elevators. Fig. 12 is a top view of same. Fig. 13 is a detail side elevation of the pivoted track of the salesmen's elevators. Fig. 14 is a top view of same. Fig. 15 is an enlarged detail perspective view of one of the cages of the salesmen's elevators, showing the device for locking it in its upper position. Fig. 16 is a perspective view of one of of the basket-pulleys. Fig. 17 is a side elevation of one of the baskets enlarged. Fig. 18 is a top view of same.

My invention relates to a device for use in stores—more especially dry-goods stores—for carrying goods and money from the salesmen to a certain part of the store where the cashier is located, and where the goods are wrapped, and from the cashier the goods and change, if any, are conveyed back to the salesman that sent them.

My invention consists in the novel construction and arrangement of parts hereinafter fully described and claimed.

Referring to the drawings, I will proceed to describe the construction and operation of the salesmen's elevators, and as they are all constructed and operated in exactly the same manner it will only be necessary to describe one of them.

A A are uprights which form guides to a cage, B, and which are secured to the floor or wall of the room, or to any suitable object, so that the elevator will be within handy reach of the salesmen who use it.

To the upper end or portion of the cage B is secured one end of a hoisting-rope, C, which passes from thence upward and over pulleys D on the upper ends of the uprights. From thence down and beneath pulleys E at the bottom of the uprights, and from thence up, and secured by its other end to the bottom of the cage. The rope passes down outside the uprights, so as not to be in the way of the cage, and it has a counter-balance, F, which is nearly, but not quite, equal to the weight of the cage.

G G are brackets with rubber cushions H H, on which the elevator rests when in its lower position.

I is a track having a gradual downward slope from the cashier's elevator (see Fig. 5) around the room and back to the same elevator, but, as a matter of course, at a lower point. At suitable intervals along this track the salesmen's elevators are located, and to have the track continuous with the cages up or down I employ the following means, viz: Secured near the top and on the face of the elevator are hooks J J, and as the elevator rises they engage with and carry up out of the way a section of track, K, which made the track continuous when the cage was down. The bottom of the track has notches K', with which the hooks engage, so that it will not be shifted endwise in the repeated raising and lowering of it. It is supported, when the elevator descends, by its V-shaped inclined ends entering V-shaped grooves in the oppositely-inclined adjacent ends of the main track. (See Figs. 11 and 12, which illustrate the exact formation of the parts.) When the elevator is in its upper position this gap in the track is closed by a section of track, L, which is supported on brackets L', secured to the cage, and one end of the track-section L is pivoted to one of the brackets for the purpose hereinafter described, and the other end simply rests upon the other bracket. It will thus be seen that, whether the cage is up or down, the track will be continuous. To hold the cage in its upper position until the basket belonging to it operates it and carries it down, I secure a horizontal rod, M, to the bottom of the cage by means of boxings M', in which it has capacity for endwise movement. To one of the uprights A is secured a stationary stop-block, N, with which the end of the bar or rod M engages when in its normal position, and to the other upright A is secured a spring-stop, O, which engages with the bottom of the cage by means of a notch, B'. To the rod M is suitably connected the lower end of a lever, P, fulcrumed to the cage at $P^2$, and having a projection, P', on its upper end, which engages with an eye, $Q^2$, on the upper end of a bracket, Q', in which a grooved pulley, Q, is journaled. (See Fig. 16.) The grooved pulley fits over the track, and the basket $Q^3$, for receiving the goods and cash, is hung upon the lower end of the pulley-bracket. As the basket travels down the inclined track from the cashier's elevator the eye of the bracket engages the pin on the upper end of the lever P and carries it over, moving the bar M to the left, which disengages it from the stop N and throws the spring-stop O out of engagement with the bottom of the cage, which allows the cage and basket to drop to the salesman, who unhooks the lever P, which is then pulled back by a suitable spring, R, or otherwise, the top of the cage being rounding to force the springs back, and the lower part of the stationary stop N being inclined to force the bar M back to allow the cage to pass in its ascent.

The track L is grooved out at $L^2$ on its top, into which the basket-pulley rolls and rests after operating the lever, as shown in Fig. 2. In order that a basket will not operate any but its own cage, and consequently go to the wrong salesman, the pins on the upper ends of the levers of the different elevators are all of different heights or shapes, and the eyes of the pulley-brackets of the different elevators correspond in height and shape with their respective elevator-pins, and thus the baskets will pass over and not operate the cage of another, but will go on and operate their own different heights and shapes of eyes of the pulley-brackets, as shown in Fig. 16.

When a salesman wants to send goods and cash to the cashier, where the goods are wrapped and the change made, he places them in the basket, together with the purchase-money, and then pulls up the cage by means of the hoisting-rope until its upper end comes against stops S, near the tops of the uprights. The stops are placed high enough, so that the cage can be raised until the track L is a little higher than the main track, which allows the track L to be tilted on the bracket, to which it is pivoted, as described, (see Figs. 3 and 4,) by means of a strip, T, secured to the track L, and engaging beneath the main track, as shown. This starts the pulley Q out of the groove in the track L, and the basket is carried down the inclined track to the cashier's elevator, where it is stopped by the upturned end of the track, as shown in Figs. 5 and 6, from where it is removed by lifting the pulley from the track and the money taken out by the cashier, and the goods also taken out and wrapped. The goods are then replaced in the basket, together with the change, if any, and the pulley hooked over the section of track U of the cashier's elevator V, which is then raised and started off onto the main track, in the same way as done by the salesman, and carried back to its own elevator-cage, which it unlocks and carries down, as described.

It is not designed that a salesman should send a second bundle before the first is returned.

The cashier's cage is guided between uprights W, and is, as a whole, constructed and operated the same as the salesmen's, except that it has not got the hooks for carrying up the false track, as it needs no false track, nor the locking device, for it needs no locking device, because as soon as it is raised up and the basket started off it would need to gravitate to its lower position to receive the next basket. Before the salesman raised his cage he would unhook the eye of the pulley-bracket from the lever P.

It is designed to use light wicker-baskets with covers.

I claim as my invention—

1. In a combined cash and bundle conveyer, the inclined track I, in combination with removable track K, and cage B, with hooks J, substantially as and for the purpose set forth.

2. In a combined cash and bundle conveyer, the inclined track I, in combination with cage B, and track L, pivoted to the cage, substantially as and for the purpose set forth.

3. In a combined cash and bundle conveyer, the rod or bar M, secured to the cage B, and having a lever, P, fulcrumed to the cage, with a projection on its upper end, in combination with basket-bracket Q, with eye $Q^2$, and stationary stop N, and spring-stop O, all substantially as shown and described, for the purpose set forth.

4. In a combined cash and bundle conveyer, a series of basket-brackets having an eye, $Q^2$, of different heights, in combination with a series of levers, P, fulcrumed to the cages B of the salesman's elevator, and having projections P', of different heights, all substantially as shown and described, for the purpose set forth.

RICHARD F. JONES.

Witnesses:
JOSEPH SPECHS,
GEO. H. KNIGHT.